US010226977B2

(12) United States Patent
Coppuck

(10) Patent No.: US 10,226,977 B2
(45) Date of Patent: Mar. 12, 2019

(54) VEHICLE SUSPENSION

(71) Applicant: Gordon Murray Design Limited, Shalford, Surrey (GB)

(72) Inventor: Frank Coppuck, Hook (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 139 days.

(21) Appl. No.: 15/306,960

(22) PCT Filed: May 8, 2015

(86) PCT No.: PCT/EP2015/060189
§ 371 (c)(1),
(2) Date: Oct. 26, 2016

(87) PCT Pub. No.: WO2015/169948
PCT Pub. Date: Nov. 12, 2015

(65) Prior Publication Data
US 2017/0050484 A1    Feb. 23, 2017

(30) Foreign Application Priority Data
May 8, 2014    (GB) .................................. 1408114.5

(51) Int. Cl.
*B60G 3/20*    (2006.01)
(52) U.S. Cl.
CPC ........ *B60G 3/202* (2013.01); *B60G 2200/141* (2013.01); *B60G 2200/182* (2013.01); *B60G 2206/124* (2013.01)
(58) Field of Classification Search
CPC .............. B60G 3/302; B60G 2200/141; B60G 2200/182; B60G 2206/124
See application file for complete search history.

(56) References Cited

U.S. PATENT DOCUMENTS

| 4,515,391 A | 5/1985 | Koide | |
| 4,556,238 A * | 12/1985 | Matschinsky | ............ B60G 3/24 280/124.135 |

(Continued)

FOREIGN PATENT DOCUMENTS

| DE | 4206896 A1 | 9/1993 |
| EP | 0182606 A2 | 5/1986 |

(Continued)

OTHER PUBLICATIONS

International Search Report and Written Opinion issued for PCT/EP2015/060189, dated Sep. 2, 2015.

*Primary Examiner* — Faye M Fleming
(74) *Attorney, Agent, or Firm* — Westman, Champlin & Koehler, P.A.; Z. Peter Sawicki; Amanda M. Prose

(57) ABSTRACT

A vehicle suspension comprises an assembly of a hub carrier and a support arm, the support arm being attached to the hub carrier at two points spaced from each other in the direction of travel and extending inwardly therefrom to a support arm attachment point for fixing to a chassis, and a trailing link extending from the assembly in a direction transverse to that of the support arm, toward a trailing link attachment point for fixing to the chassis. The trailing link preferably extends from the assembly in a forward direction, and is preferably connected directly to the hub carrier. A strut can extend upwardly toward an attachment point for fixing to a chassis, to provide a spring and damper. The support arm can comprise a pair of arms extending divergently from the attachment point to each of the two points. A toe control link extends generally parallel to but spaced from the rear arm, linking the hub carrier to the chassis to provide geometry control under high load conditions. The invention further relates to a vehicle, comprising a chassis and at least two (Continued)

wheels, one on each side of the vehicle, each wheel being attached to the chassis via such a suspension.

17 Claims, 3 Drawing Sheets

(56) References Cited

U.S. PATENT DOCUMENTS

| | | | |
|---|---|---|---|
| 4,664,412 A | 5/1987 | Matschinsky | |
| 4,840,396 A * | 6/1989 | Kubo | B60G 3/202 |
| | | | 280/124.143 |
| 4,848,788 A * | 7/1989 | Rumpel | B60G 3/202 |
| | | | 267/292 |
| 5,048,860 A * | 9/1991 | Kanai | B60G 3/205 |
| | | | 280/124.138 |
| 5,938,219 A | 8/1999 | Hayami | |
| 8,708,359 B2 * | 4/2014 | Murray | B60G 3/202 |
| | | | 280/124.116 |
| 9,469,173 B2 * | 10/2016 | Murray | B60G 3/202 |

FOREIGN PATENT DOCUMENTS

| | | | | |
|---|---|---|---|---|
| FR | 2202790 A1 | 5/1974 | | |
| GB | 2135945 A | 9/1984 | | |
| GB | 2198398 A | 6/1988 | | |
| GB | 2468302 A | 9/2010 | | |
| JP | 02038106 A * | 2/1990 | | B60G 3/202 |
| JP | H0274408 A | 3/1990 | | |
| JP | 04358911 A * | 12/1992 | | B60G 3/202 |
| JP | 05104921 A * | 4/1993 | | B60G 3/202 |

\* cited by examiner

VEHICLE SUSPENSION

CROSS-REFERENCE TO RELATED APPLICATION

This application is a Section 371 National Stage Application of International Application No. PCT/EP2015/060189, filed May 8, 2015, and published as WO2015/169948 on Nov. 12, 2015, which claims priority to and benefits of GB Patent Application Serial No. 1408114.5, filed May 8, 2014, the contents of which are herein incorporated by reference in their entirety.

FIELD OF THE INVENTION

The present invention relates to suspension for vehicles.

BACKGROUND ART

Vehicles need a suspension system in order to keep the wheels in contact with the surface over which the vehicle is being driven, and to insulate the vehicle body from at least some of the undulations in that surface. The former requirement is necessary in order to ensure the safe and effective handling of the vehicle, and the latter is necessary in order to provide the necessary level of ride comfort. Generally, these two requirements act in opposite directions, and a suspension system is therefore a compromise between the two. A range of suspension systems are known.

The MacPherson strut suspension, often used for the front suspension, comprises a wishbone or a substantial compression link stabilized by a secondary link, which provides a bottom mounting point for a wheel hub or axle. This lower arm system provides both lateral and longitudinal location of the wheel. The upper part of the hub is rigidly fixed to the inner part of a sprung and damped strut, which extends upwards directly to a mounting in the body shell of the vehicle.

Double wishbone suspension locates the wheel through the use of two (upper and lower) arms, each in the shape of an "A" or a wishbone. Each arm has two mounting points on the chassis and one joint at the knuckle. A shock absorber and coil spring are mounted to the wishbones to control vertical movement. Double wishbone designs allow the engineer to carefully control the motion of the wheel throughout suspension travel, controlling such parameters as camber angle, caster angle, toe pattern, roll center height, scrub radius, scuff and more.

A multi-link suspension uses three or more lateral arms, together with one or more longitudinal arms, to define and constrain the movement of the wheel hub. These arms do not have to be of equal length, and may be angled away from their 'obvious' direction. Typically each arm has a spherical joint (ball joint) or rubber bushing at each end, and therefore react loads along their own length, in tension and compression, but not in bending. Some multi-links also use a trailing arm or wishbone, which has two bushings at one end.

All have relative advantages and disadvantages, typically reflecting a variation in the level of ride comfort or handling that is achievable against the cost and complexity of the system.

SUMMARY OF THE INVENTION

The present invention seeks to provide a suspension system for a vehicle that offers levels of ride comfort and/or handling that meet or exceed the demanding standards that are now set, but through the use of a significantly lower parts count.

Such a reduction in parts count offers great advantages in use. The immediate advantage lies, of course, in the cost of the system in that if fewer parts need to be made and assembled, then the resulting cost of the assembly is directly reduced. However, other advantages also flow from a reduced parts count, in that the levels of parts stocking that is required of assemblers and dealers is reduced, the material usage is reduced, the weight of the system and of the vehicle is reduced, and so on. As well as reducing the build cost of the vehicle, these factors contribute directly to a reduction in the running costs of the vehicle in terms of its fuel consumption, servicing costs, and environmental impact.

The present invention therefore provides a vehicle suspension, comprising an assembly of a hub carrier and a support arm, the support arm being attached to the hub carrier at two points spaced from each other in the direction of travel and extending inwardly therefrom to a support arm attachment point for fixing to a chassis, a trailing link extending from the assembly in a direction transverse to that of the support arm, toward a trailing link attachment point for fixing to the chassis, and a toe control link attached to the hub carrier at a location spaced vertically from the two points and extending inwardly from there to an attachment point for fixing to the chassis.

The trailing link preferably extends from the assembly in a forward direction, thereby placing it under tension, reducing the likelihood of it buckling, and hence allowing for a more slender item that has less weight and uses less material in its production. It is preferably connected directly to the hub carrier.

A strut can be provided, extending upwardly toward an attachment point for fixing to a chassis, to provide the necessary vertical positioning of the suspension, together with (preferably) the usual spring and damper.

The toe control link is ideally attached to the hub carrier at a point located outward of the two points at which the support arm is attached to the hub carrier. Likewise, we prefer that the single attachment point at which the toe control link is attachable to a chassis is located inward of the support arm attachment point at which support arm is attachable to a chassis.

The support arm can comprise a pair of arms extending divergently from the attachment point to each of the two points. Of these two arms, one is preferably shorter than the toe control link. This is, in effect, a wishbone form, but mounted in an orientation that is the opposite of the usual orientation. The fixing of the support arm attachment point is preferably one allowing movement of the support arm relative to the chassis in all directions, such as one in which the support arm is mounted to the chassis via a cylindrical section mounted on a stud via a rubber bushing.

The hub carrier can include a pivot pin extending in a fore/aft alignment, passing through two pivot points on the support arm thereby to define the two points. The appropriate end of the pivot pin then provides a convenient location for attaching the trailing link to the hub carrier. Such an arrangement is shown in our earlier patent application WO2010/100412. Alternatively, a ball joint can be used to connect each of the two arms of the support arm to the hub carrier.

The hub carrier preferably carries an axle, which can be driven via a drive shaft extending from an engine or from a suitable differential or other gearbox. A wheel can be fitted to the axle.

The toe control link provides additional dynamic geometry control, especially under high loading conditions, such as is often called for in sports or high-performance cars.

The invention further relates to a vehicle, comprising a chassis and at least two wheels, one on each side of the vehicle, each wheel being attached to the chassis via a suspension as defined above.

A design of this type has particular advantage for vehicles with a narrow track, as it allows a suspension to be packaged within a very narrow confine. This also makes the suspension particularly suited to vehicles with a rear- or mid-engined power train installation (both transverse and inline) as the more limited space demanded by the suspension allows greater room for the engine and powertrain. Most designers struggle to package the suspension, driveshafts and powertrain within the space available, and have to employ complex pressed metal suspensions.

In this application, directions or orientations referred to are intended to be interpreted relative to the vehicle on which the suspension is, or is intended to be, mounted. Thus, a "forward" or "fore" direction means one towards the front of the vehicle, and a "rearwards" or "aft" direction is to be interpreted likewise. Similarly, a direction such as "inward" means one that is towards the centreline of the vehicle, "outwards" meaning the opposite. It is not intended that strict geometric alignment be inferred (unless indicated otherwise); thus a "forward" direction is not necessarily limited to one that is precisely aligned with the vehicle's direction of travel, but indicates a forward direction as opposed to a rearward or an inward direction.

BRIEF DESCRIPTION OF THE DRAWINGS

An embodiment of the present invention will now be described by way of example, with reference to the accompanying figures in which.

DETAILED DESCRIPTION OF THE EMBODIMENTS

A modern lightweight and efficient ultra-compact city car requires an independent, lightweight rear suspension with excellent camber and toe control. For packaging reasons we also need the suspension to allow the installation of a rear transverse mounted engine and transmission unit in the close proximity. Normal practice is to use either trailing arm, semi trailing arm, De-Dion or Semi-De-Dion type suspensions. These are however very heavy, expensive, and provide very poor control of camber and toe control at the tyre contact patch. In many instances, they provide no independence from side to side. We sought to design a system that provides all the advantages of a conventional McPherson strut system with the added advantage of much more effectively decoupling the transverse compliance from the longitudinal compliance.

Figure 1:
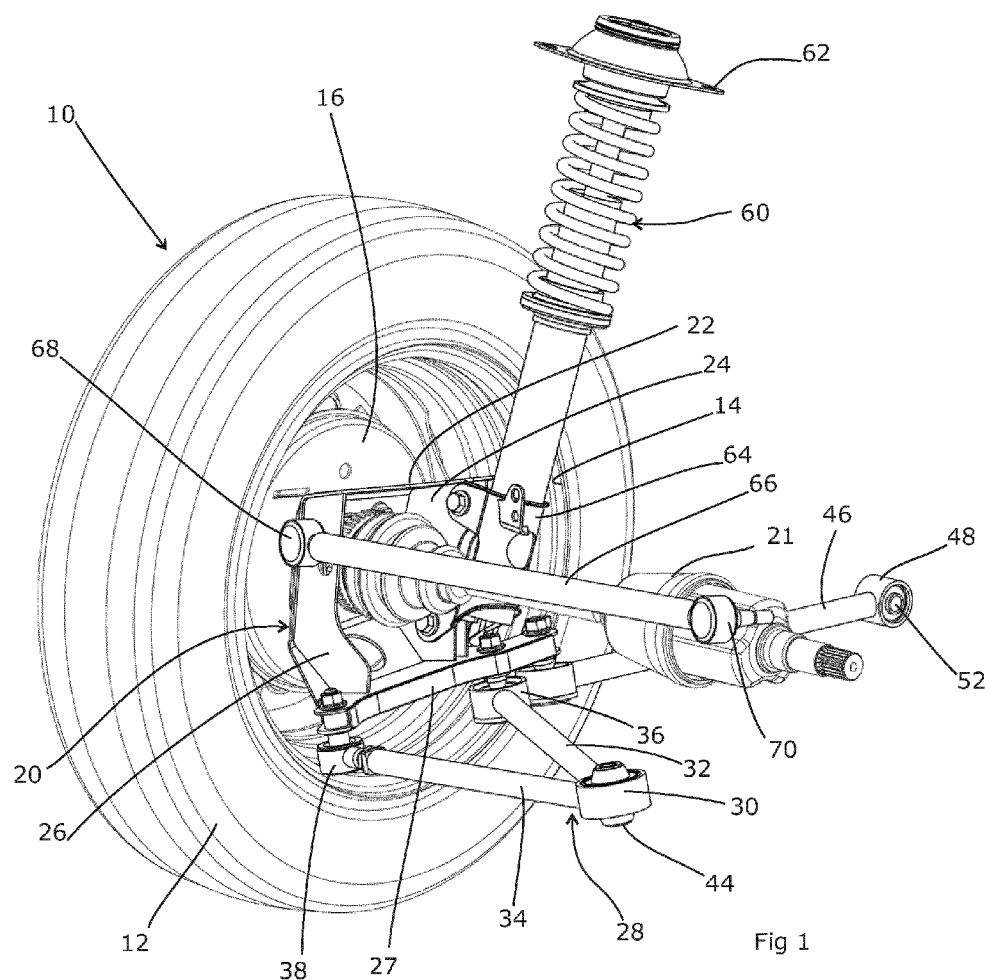
FIG. 1 shows a perspective view of the suspension system.

FIG. 1 shows an embodiment of the present invention, shown in the form of a wheel and the associated suspension separate from the vehicle chassis to which it would, in use, be attached.

Thus, a wheel 10 comprising a tyre 12 fitted onto a rim 14 is bolted to a wheel hub 16. This is attached to an axle and the assembly is rotateably supported on a hub carrier 20. A drive shaft 21 leads from a differential to the axle 18 in order to transmit drive torque to the wheel 10 and propel the vehicle.

The hub carrier 20 comprises a mount for the axle 18 and hub 16 comprising suitable bearings (not visible) to allow rotation thereof, and a set of stiffening flanges extending inwardly therefrom to provide rigidity to the hub carrier 20 and mounting points for the suspension elements. An upper flange 22 extends from an upper edge of the hub carrier 20, together with two side flanges in the form of a fore side flange 24 and an aft side flange 26, and a lower flange 27. To these flanges are connected the principal suspension components, as follows.

First, an inverted wishbone 28 provides lateral compliance to the system. This is inverted in that, contrary to usual practice, there is a single attachment point 30 at the chassis, from which two wishbone arms 32, 34 extend to (respectively) a fore attachment point 36 and an aft attachment point 38 on the lower flange 27, near to its join with the respective side flanges 24, 26 of the hub carrier 20. Each of the attachment points 30 is via a balljoint, allowing appropriate articulation of the connection.

An alternative form for the fore and aft attachment points is a rod passing through apertures in the side flanges 24, 26, and through corresponding cylindrical sections at the ends of the wishbone arms 32, 34. Thus, the wishbone arms 32, 34 are anchored onto the rod 40, allowing the necessary relative rotation as the wheel rises and falls. Such an arrangement is shown in our earlier application WO2010/100412.

A similar balljoint is included in the chassis attachment point 30, oriented vertically so as to allow for some fore/aft adjustability. This is mounted onto a suitable stud 42 (not shown in FIG. 1) or the like on the chassis, via a rubber bushing 44 to allow limited movement of the wishbone arm 28 in all directions.

A trailing link 46 is also provided in order to offer fore and aft compliance. This is connected to the chassis by a horizontally-aligned cylindrical link 48 mounted on a similar stud via a rubber bushing 52. This allows easy rotation of the trailing link 46 in a vertical plane as the wheel 10 rises and falls, and also allows some movement in other directions to accommodate the suspension geometry.

At its other end, the trailing link 46 is attached to the fore end of the lower flange 27 via a further balljoint. As an alternative, the trailing arm can be connected as shown in our application WO2010/100412.

A third principal suspension element is a strut 60. This is a conventional spring and damper unit, attached to the chassis via a top mount 62 and to the hub carrier 20 via a bracket 64 that is clamped to the lower end of the strut 60 and bolted in two places to the fore side flange 24. The strut thus keeps the hub carrier in a generally upright alignment and provides a downward force to the wheel 10 to keep it in contact with the ground, and damping of the upward and downward movement of the wheel 10.

Finally, a toe control link 66 provided. This is a rigid rod extending from the hub carrier 20 to a chassis hard point (not shown), generally parallel with the rear wishbone arm 34 but spaced therefrom upwardly. A connection is made at both ends via balljoints or a conventional bush 70 respectively allowing some articulation of the connection. This link 66 enhances the dynamic geometry control under high loading conditions, by further constraining movement of the hub carrier 26 to the manner dictated by the wishbone 28 and the strut 60. Whilst this does not affect the geometry under low loading conditions, it prevents transient distortions under high loads by providing additional support and rigidity, thus ensuring that the geometry remains correct.

Figure 3:
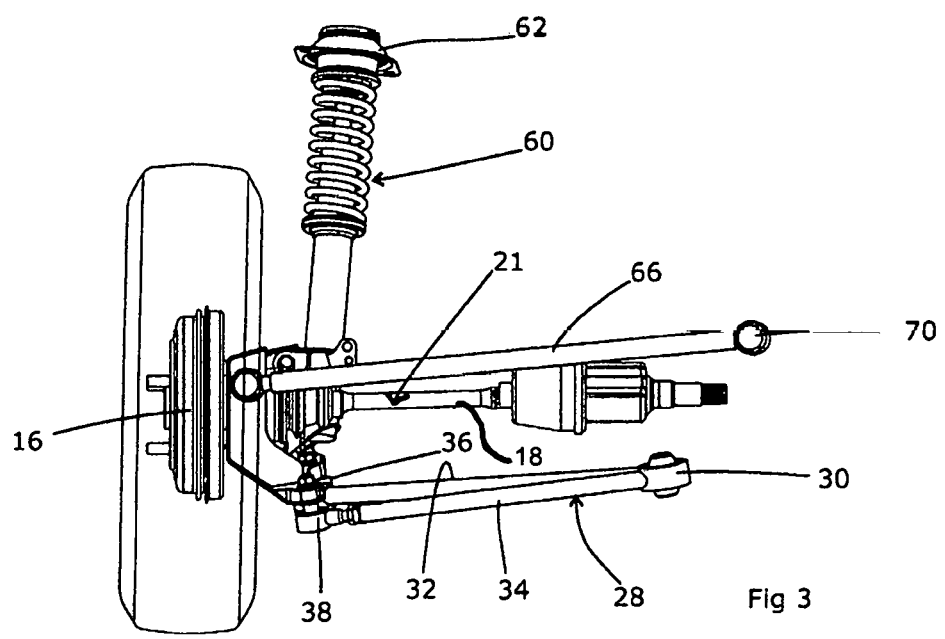
FIG. 3 shows a view of the suspension system from the rear.

FIG. 3 shows the system from one side. The wheel 10 is shown schematically, mounted on the hub 16. The inverted wishbone 28 is shown, attached to the rod 40 which can be seen to be angled upwardly toward the front of the vehicle. Likewise, the trailing arm 46 angles downwardly from its chassis mount 50 to the U-section bracket 54 on the rod 40. The strut is angled slightly forward, the top mount 62 being somewhat forward of the bracket 64. These angles and orientations can be adjusted in design of the suspension system in order to provide the desired handling properties.

Figure 2:
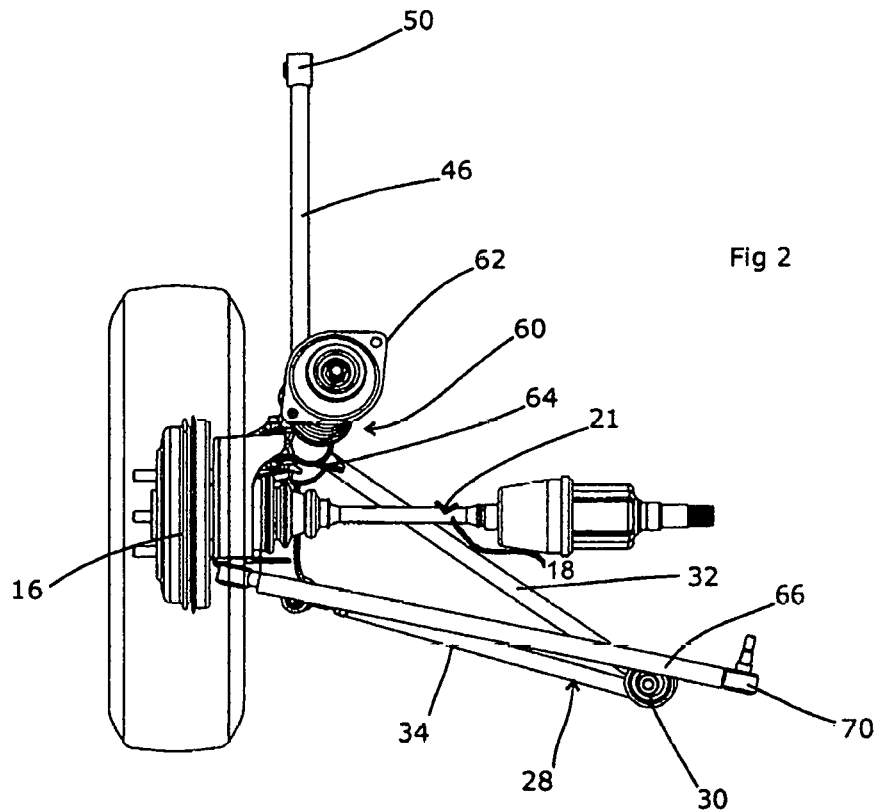
FIG. 2 shows a view of the suspension system from above.

FIG. 2 shows the system from above, illustrating the slightly forward angle of the strut 60, the top mount 62 being somewhat forward of the bracket 64. The aft wishbone arm 34 is shorter than the fore arm 32, meaning that the attachment point 30 to the chassis is aft of the wheel centreline. This allows space for the drive shaft 21 to reach the wheel hub 16, passing fore of the attachment point 30 and above the fore wishbone arm 32.

FIG. 3 shows the system from the rear, with the drive shaft 21 passing above the inverted wishbone 28. It can be seen that the attachment point 38 for the aft wishbone arm 34 is slightly lower than the attachment point 36 for the fore arm 32. These and the other angles and orientations can of course be adjusted in design of the suspension system in order to provide the desired handling properties.

As is visible in FIGS. 2 and 3, the toe control link 66 is longer than each of the fore wishbone arm 32 and the aft wishbone arm 34. The chassis hard point at which is attaches via the bush 70 is located inward of the chassis attachment point for the wishbone 28; likewise, the attachment point with the hub 16 is located outward of the attachment points for each of the fore wishbone arm 32 and the aft wishbone arm 34. These lengths and mounting points influence the under-load movement of the suspension and help provide the benefits outlined above.

Figure 4:
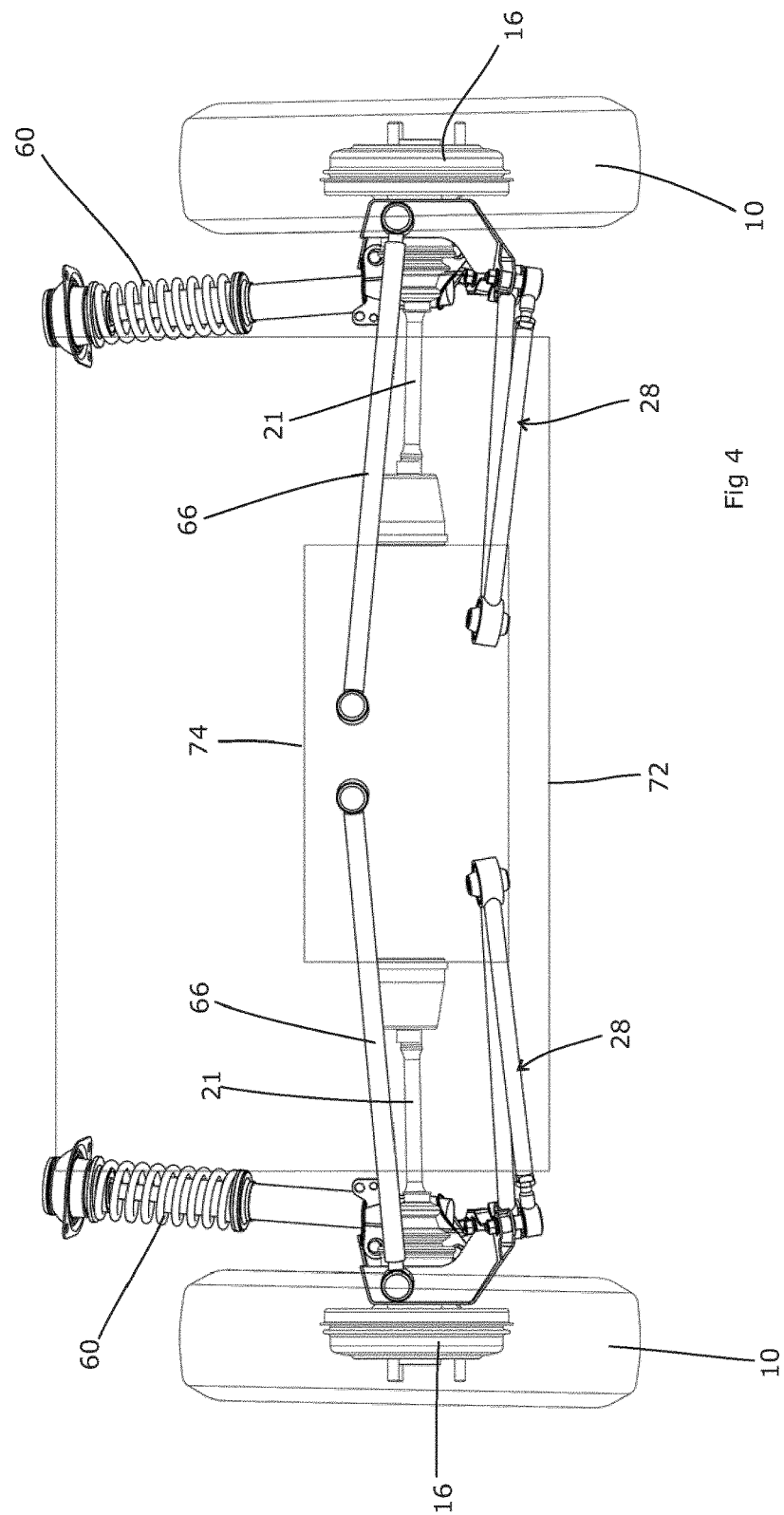
FIG. 4 shows a view of the rear part of a vehicle fitted with the suspension system of the present invention.

FIG. 4 shows a schematic view from the rear of a compact town car with the above-described suspension system installed. The chassis 72 provides the necessary mounting points, and houses an engine and gearbox 74. A pair of drive shafts 21 project outwardly in both directions from the gearbox 74 and towards wheel hubs 16 on either side of the vehicle. One wheel 10 is mounted on each wheel hub 16, and each wheel is supported by a suspension system as described above, including an inverted wishbone 28, a strut 60, and a trailing arm (not visible in FIG. 4).

As is evident from FIG. 4, the illustrated system is designed to meet the needs of the rear wheels of a rear-engined, rear wheel drive configuration. It could however be applied in other configurations, such as the driven or non-drive wheels of front-wheel drive (or other) layouts.

This 'inverted wishbone' system not only delivers the ride and handling advantages of an independent suspension system, but is also designed with a two part linkage (the inverted wishbone 28 plus the trailing link 46) to allow separation of fore and aft compliance for ride and comfort and lateral compliance for the vehicle handling control (camber and toe control). Together with the strut 60 and toe control arm 66, the overall system is extremely lightweight and has a low production cost as it comprises only three links per vehicle side and only four compliant elements per vehicle side.

The described system also requires only a small number of attachment points to the chassis, and allows them to be spaced well away from the drive shafts. This makes the system especially suited to a small and efficient town car in which component space is restricted and the wheels may be mounted close to the engine, gearbox etc.

It will of course be understood that many variations may be made to the above-described embodiment without departing from the scope of the present invention.

The invention claimed is:

1. A vehicle suspension, comprising an assembly of a hub carrier and a support arm, the support arm being attached to the hub carrier at two points spaced from each other in the direction of travel and extending inwardly therefrom to a support arm attachment point for fixing to a chassis, a trailing link extending from the assembly in a direction transverse to that of the support arm, toward a trailing link attachment point for fixing to the chassis, and a toe control link attached to the hub carrier at a single location spaced vertically from the two points and extending inwardly from there to a single attachment point for fixing to the chassis, in which the support arm comprises a pair of arms extending divergently from the attachment point to each of the two points.

2. The vehicle suspension according to claim 1 in which the trailing link extends from the assembly in a forward direction.

3. The vehicle suspension according to claim 1 further comprising a strut extending upwardly toward an attachment point for fixing to a chassis.

4. The vehicle suspension according to claim 3 in which the strut carries a spring.

5. The vehicle suspension according to claim 3 in which the strut carries a shock absorber.

6. The vehicle suspension according to claim 1 in which the single location at which the toe control link is attached to the hub carrier is located outward of the two points at which the support arm is attached to the hub carrier.

7. The vehicle suspension according to claim 1 in which the single attachment point at which the toe control link is attachable to a chassis is located inward of the support arm attachment point at which support arm is attachable to a chassis.

8. The vehicle suspension according to claim 1 in which the toe control link is longer than at least one arm of the pair of arms.

9. The vehicle suspension according to claim 1 in which the hub carrier includes a pivot pin extending in a fore/aft alignment, and which passes through two pivot points on the support arm thereby to define the two points.

10. The vehicle suspension according to claim 1 in which the fixing of the support arm attachment point is one allowing movement of the support arm relative to the chassis in all directions.

11. The vehicle suspension according to claim 1 in which the support arm is mounted to the chassis via a cylindrical section mounted on a stud via a rubber bushing.

12. The vehicle suspension according to claim 1 in which the trailing link is connected to hub carrier.

13. The vehicle suspension according to claim 9 in which the trailing link is connected to an end of the pivot pin.

14. The vehicle suspension according to claim 1 further comprising an axle carried by the hub carrier.

15. The vehicle suspension according to claim 14 in which the axle is a driven axle.

16. The vehicle suspension according claim 14 further comprising a wheel fitted to the axle.

17. A vehicle comprising a chassis and at least two wheels, one on each side of the vehicle, each wheel being attached to the chassis via a suspension comprising an assembly of a hub carrier and a support arm, the support arm being attached to the hub carrier at two points spaced from each other in the direction of travel and extending inwardly therefrom to a support arm attachment point for fixing to a chassis, a trailing link extending from the assembly in a direction transverse to that of the support arm, toward a trailing link attachment point for fixing to the chassis, and a toe control link attached to the hub carrier at a single location spaced vertically from the two points and extending inwardly from there to a single attachment point for fixing to the chassis in which the support arm comprises a pair of arms extending divergently from the attachment point to each of the two points, and in which the hub carrier includes a pivot pin extending in a fore/aft alignment, and which passes through two pivot points on the support arm thereby to define the two points.

* * * * *